(12) United States Patent
Shivakumar et al.

(10) Patent No.: US 7,332,112 B1
(45) Date of Patent: Feb. 19, 2008

(54) APPARATUS AND METHOD FOR FORMING DENSIFIED, CARBON-CARBON COMPOSITES

(75) Inventors: Kunigal N. Shivakumar, Greensboro, NC (US); Vishnu Sarma Avva, Greensboro, NC (US); Mannur J. Sundaresan, Greensboro, NC (US); Felix Abali, Greensboro, NC (US); Anthony Cunningham, Greensboro, NC (US); Robert L. Sadler, Greensboro, NC (US)

(73) Assignee: N.C. A&T State University, Greensboro, NC (US)

( * ) Notice: Subject to any disclaimer, the term of this patent is extended or adjusted under 35 U.S.C. 154(b) by 0 days.

(21) Appl. No.: 10/852,293

(22) Filed: May 24, 2004

Related U.S. Application Data

(60) Continuation of application No. 09/962,789, filed on Sep. 25, 2001, now abandoned, which is a division of application No. 09/313,232, filed on May 17, 1999, now Pat. No. 6,325,608.

(51) Int. Cl.
*C01B 31/02* (2006.01)
*C04B 35/532* (2006.01)
(52) U.S. Cl. .................. 264/29.5; 264/29.3; 264/29.6
(58) Field of Classification Search .......... 264/29.3, 264/29.5, 29.6
See application file for complete search history.

(56) References Cited

U.S. PATENT DOCUMENTS

| | | | |
|---|---|---|---|
| 3,462,289 A | 8/1969 | Rohl et al. | 427/228 |
| 3,779,955 A | 12/1973 | Wade | 521/141 |
| 3,809,673 A | 5/1974 | White et al. | 524/104 |
| 3,975,318 A | 8/1976 | Larsen et al. | 521/136 |
| 4,178,413 A | 12/1979 | DeMunda | 428/408 |

(Continued)

OTHER PUBLICATIONS

T. Fang and D. Shimp, "Polycyanate Esters: Science And Applications," Prog. Polym. Sci., vol. 20, pp. 61-118, 1995.*

(Continued)

*Primary Examiner*—Melvin Mayes
(74) *Attorney, Agent, or Firm*—MacCord Mason PLLC

(57) ABSTRACT

An apparatus and method for forming a densified carbon-carbon composite. The apparatus includes: a green part molding station for forming a green part; a carbonization station for carbonizing the green part; and an impregnation station for impregnating the carbonized part with a substantially curing by-product free, high carbon yield resin. The impregnation station includes a mold forming a sealed enclosure configured in the shape of the carbonized part for receiving the carbonized part and a vacuum source for evacuating the mold. At least one resin injection port is in the mold and a supply of substantially curing by-product free, high carbon yield resin is connected to the resin injection port for injection into the mold. In the preferred embodiment, the substantially curing by-product free, high carbon yield resin is a cyanate ester having a viscosity of less than about 100 cps at 250° F. and a carbon yield value of greater than about 60 wt. %. The combination of a high carbon yield resin and a pressurized impregnation station configured to the shape of the composite part for use with a curing by-product free resin provides for a substantial reduction in the number of carbonization cycles required to reach final density while, at the same time avoids the environmental and safety problems of a solvent-based system.

40 Claims, 6 Drawing Sheets

U.S. PATENT DOCUMENTS

| | | | |
|---|---|---|---|
| 4,225,569 A | 9/1980 | Matsui et al. | 264/29.1 |
| 4,284,834 A | 8/1981 | Ausin et al. | 585/25 |
| 4,487,799 A | 12/1984 | Galasso et al. | 428/334 |
| 4,833,030 A * | 5/1989 | Petersen | 428/408 |
| 4,975,261 A | 12/1990 | Takabatake | 264/29.5 |
| 5,096,635 A * | 3/1992 | Feist | 264/40.3 |
| 5,137,755 A | 8/1992 | Fujikawa et al. | 264/29.5 |
| 5,149,863 A * | 9/1992 | Shimp et al. | 560/301 |
| 5,157,105 A * | 10/1992 | Corley et al. | 528/322 |
| 5,171,560 A | 12/1992 | Tennent | 264/29.2 |
| 5,217,657 A | 6/1993 | Engle | 264/29.5 |
| 5,306,448 A | 4/1994 | Kromrey | 264/29.5 |
| 5,349,111 A * | 9/1994 | Scheck | 568/721 |
| 5,362,567 A | 11/1994 | Washburn et al. | 428/408 |
| 5,382,392 A | 1/1995 | Prevorsek et al. | 264/29.5 |
| 5,418,063 A | 5/1995 | Booth | 428/408 |
| 5,441,692 A | 8/1995 | Taricco | 264/571 |
| 5,518,385 A | 5/1996 | Graff | 425/129.1 |
| 5,556,704 A * | 9/1996 | Prevorsek et al. | 428/408 |
| 5,705,008 A * | 1/1998 | Hecht | 156/148 |
| 5,770,127 A | 6/1998 | Abrams et al. | 264/29.1 |
| 5,882,726 A | 3/1999 | Sheehan | 427/228 |
| 6,309,703 B1 | 10/2001 | Wapner et al. | 427/288 |
| 6,325,608 B1 | 12/2001 | Shivakumar et al. | 425/129.1 |
| 6,537,470 B1 * | 3/2003 | Wood et al. | 264/29.5 |
| 2005/0184413 A1* | 8/2005 | Forest et al. | 264/29.1 |

OTHER PUBLICATIONS

Carbon-Carbon Composite by G. Savage, 1st Edition, 1993 pp. 37-80, 85-93, 112-113, 117-156, 157-191, 323-358, 367-383.

Carbon Coating of ceramic monolithic substrates by Th. Vergunst, F. Kapteijn and J.A. Moulijn, 1998, pp. 175-183.

Article Entitled Macromolecular Nomenclature Note No. 23 by E.S. Wilks, undated possible prior art.

* cited by examiner

APPARATUS AND METHOD FOR FORMING DENSIFIED, CARBON-CARBON COMPOSITES

This application is a continuation of U.S. application Ser. No. 09/962,789, filed Sep. 25, 2001, now abandoned, which is a divisional of U.S. application Ser. No. 09/313,232, filed May 17, 1999, now U.S. Pat. No. 6,325,608.

This invention was made with government support under various contracts awarded through the Department of Defense. The government has certain rights in this invention.

BACKGROUND OF THE INVENTION (1) Field of the Invention

The present invention relates generally to the manufacturing of composite materials, and, more particularly to the manufacture of carbon-carbon composites by densifying carbon-carbon composites with a polymeric matrix.

(2) Description of the Prior Art

Carbon-carbon composites are comprised of a carbonaceous matrix reinforced by carbon fibers. Such composites are used to combine the advantages of fiber-reinforced composites with the refractory properties of structural ceramics. These composites maintain their properties at high temperatures making them suitable for uses such as space vehicle heat shields, rocket nozzles and aircraft brakes. Additional applications have been found for these composites in the medical and industrial areas given the composite's biocompatibility, chemical inertness and thermal conductivity.

A common method of manufacturing carbon/carbon composites is by pyrolyzing a carbon fiber/polymeric composite. One example would be a polymeric composite based on autoclave cured carbon fiber/phenolic prepreg. The prepreg is cut and stacked on a molding tool. The assembly of the prepreg and mold are bagged and placed in a autoclave. A vacuum is pulled on the bag and the temperature is raised in the autoclave at a specified rate. At the time the resin softens, the autoclave pressure is increased to about 100 psi. The autoclave is then held at about 350° F. for about two hours. Next, the autoclave is cooled to room temperature and the cured composite is removed from the tool.

The cured composite is placed in a carbonization furnace and heated slowly at a specified rate in the absence of oxygen to about 1000° C. This process often requires a number of days. The heating step volatilizes all of the organic portion of the phenolic molecule except for the carbon. The phenolic resin looses about 35% of its weight during the carbonization process creating microvoids or porosity in the composite. Significantly, these voids extend to the center of the item being manufactured and must be filled in order to maximize the strength of the final product.

The voids are then filled with a solvent diluted resin by series of vacuum and pressure cycles. The carbon/carbon composite is submerged in the solvent solution of phenolic resin (or other high carbon content material such as furan thermoset resin) and evacuated. While still submerged in the solution, pressure is added to further push the solution into the composite porosity. The impregnated composite is then dried to remove the solvent. Care must be taken to remove all the solvent without losing the resin. After all the solvent is removed, the resin must then be cured or otherwise stabilized in the composite pores.

The resin impregnated carbon/carbon composite is then recarbonized by essentially the same carbonization process. If the process fully performs its purpose, the micro void content is reduced by another increment. The amount of this reduction depends on the solvent/resin ratio and the carbon content of the resin used. The solvent/resin solution typically is about 50% resin by volume and a resin with a high carbon yield looses about 35% of its volume during carbonization. This results in about 18% of void volume that is filled by repeated re-impregnation and recarbonization. This process is called densification.

The purpose of densification is primarily to obtain good mechanical properties. As the density increases, so do the mechanical properties of the resulting composite. Three or more re-impregnations (and carbonizations) are sometimes required to achieve a useful product depending on the end use for the composite.

Although the use of carbon-carbon composites has become widespread, the market for these materials has been limited due to their high cost of production. These costs arise in part from the need for the multiple re-impregnations and carbonizations steps. As discussed above, these steps can take days and are susceptible to high production loss rates from minor imperfections in the process.

Thus, there remains a need for an apparatus for forming a densified carbon-carbon composite which provides for a substantial reduction in the number of carbonization cycles required to reach final density while, at the same time avoids the environmental and safety problems of a solvent-based system.

SUMMARY OF THE INVENTION

The present invention is directed to an apparatus and method for forming a densified carbon-carbon composite. The invention improves on prior art approaches by impregnating either a green part or a carbon-carbon composite using a low viscosity resin that is thinned with heat as opposed to prior art solvent processes. The heated resin is forced into the interstices of the item in an evacuated mold under pressure developed in a resin transfer molding apparatus. This injection pressure is maintained throughout the duration of the curing process. This continuous pressure is made possible by the fact that the resin contains no solvents and thus produces no gaseous by-products during curing.

The apparatus of the present invention includes: a green part molding station for forming a green part; a carbonization station for carbonizing the green part; and an impregnation station for impregnating the carbonized part with a substantially curing by-product free, high carbon yield resin; and a vacuum system for evacuating the mold. Desirably, the green part molding station and the impregnation station are essentially the same station.

In the preferred embodiment, the impregnation station includes a mold forming a sealed enclosure for receiving the carbonized part and configured in the shape of the carbonized part. At least one resin injection port is in the mold and a supply of substantially curing by-product free, high carbon yield resin is connected to the resin injection port for injection into the mold. The impregnation station includes a heater for curing the resin impregnated carbonized body. In addition, the impregnation station includes a press for maintaining the carbonized part under pressure during impregnation and curing.

A pump is connected between the resin injection port and the supply of resin. The pump is operated at a pressure just sufficient to fill the sealed enclosure with the resin to prevent damage to the carbonized part. Then, a second, packing pressure further impregnates the carbonized part with the resin.

In the preferred embodiment, the substantially curing by-product free, high carbon yield resin is a cyanate ester having a viscosity of less than about 100 cps at 175° F. and, most preferably a viscosity of less than about 50 cps at 175° F. Also, preferably, the substantially curing by-product free, high carbon yield resin has a carbon yield value of greater than about 25 wt. % or, in the most preferred embodiment a carbon yield value of greater than about 60 wt. %.

The carbonization station includes an enclosed chamber, a heater and a non-oxidizing atmosphere. The non-oxidizing atmosphere desirably is maintained at a positive pressure in the enclosed chamber. In the preferred embodiment, the non-oxidizing atmosphere is a non-reactive gas, such as nitrogen. A filtering system downstream from the carbonization station cleans the exiting gas before it is discharged.

The combination of a high carbon yield resin and a pressurized impregnation station configured to the shape of the composite part for use with a curing by-product free resin provides for a substantial reduction in the number of carbonization cycles required to reach final density without the environmental and safety problems of a solvent-based system.

Accordingly, one aspect of the present invention is to provide an apparatus for forming a densified carbon-carbon composite. The apparatus includes: a green part molding station for forming a green part; and an impregnation station for impregnating the green part with a substantially curing by-product free, resin.

Another aspect of the present invention is to provide an impregnation station for impregnating a carbonized part with a substantially curing by-product free, high carbon yield resin to form a densified carbon-carbon composite. The apparatus includes: a mold forming a sealed enclosure for receiving the carbonized part and configured in the shape of the carbonized part; at least one resin injection port in the mold; and a supply of substantially curing by-product free, high carbon yield resin connected to the resin injection port.

Still another aspect of the present invention is to provide an apparatus for forming a densified carbon-carbon composite. The apparatus includes: a green part molding station for forming a green part; a carbonization station for carbonizing the green part; and an impregnation station for impregnating the carbonized part with a substantially curing by-product free, resin, the impregnation station including: a mold forming a sealed enclosure for receiving the carbonized part and configured in the shape of the carbonized part; at least one resin injection port in the mold; and a supply of substantially curing by-product free, high carbon yield resin connected to the resin injection port.

These and other aspects of the present invention will become apparent to those skilled in the art after a reading of the following description of the preferred embodiment when considered with the drawings.

DESCRIPTION OF THE PREFERRED EMBODIMENTS

Figure 1:
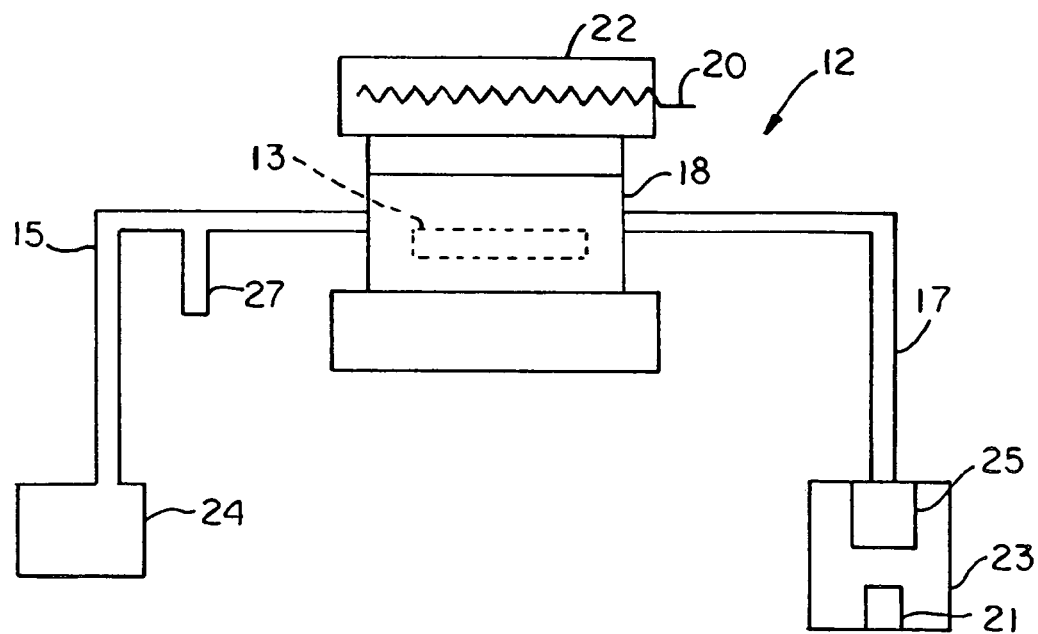
FIG. 1 is a schematic illustration of the green part molding station of the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to Table 1 below, there is shown a comparison of the steps of commonly known processes for making a carbon-carbon composite to the process of the present invention.

TABLE 1

| CVD | SOLVENT IMPREGNATION | PRESENT INVENTION |
|---|---|---|
| Carbon Fabric Polymeric Matrix | Carbon Fabric Polymeric Matrix | Carbon Fabric Polymeric Matrix |
| Carbonization Step | Green Part Carbonization Step | Green Part Carbonization Step |
| CVD Impregnation | Go to Vat Vacuum/Pressure of solvated resin | Go to Impregnation Station Vacuum/Pressure No Gaseous By-products during Resin Curing High Carbon Yield Resin Cure |
| | Dry to Remove Solvent Cure Further Carbonization Step | Further Carbonization Step Impregnation/Cure |

The known processes include, among others, chemical vapor deposition (CVD) and a solvent-based system that uses a solvent to liquefy the polymeric resin for impregnation into the carbon fiber structure. Both these processes and the present invention use a carbon fabric and a polymer resin as basic components. These components are combined to from a "green part" which will have a carbon and a non-carbon component. The green part then goes through a first carbonization step after which other steps are conducted depending on the method employed. The impregnation and carbonization steps are repeated until a desired level of density is achieved.

With the CVD process, it is difficult to densify the central regions of thick items. This is because the initial densification steps tend to block the outer regions of the part. As these outer regions become blocked, it becomes every more difficult to force the gas to the center of the part.

In a preferred embodiment, the green part is constructed from a preform comprised of multiple layers of a woven carbon fabric that are tacked together. In one approach, the layers are tacked together with a low melt, powdered epoxy material such as Shell Chemical's Epon 1031. The layers with the powdered epoxy therebetween are compacted in a vacuum bag and then heated until the melting temperature of the epoxy is reached. The relatively stiff, bonded layers are referred to as a preform. It will be appreciated by one of ordinary skill that for composites having a flat shape, the epoxy bonding step may be omitted. However, for more complicated shapes, creating a preform is desirable. The preform is them impregnated with a resin to create a carbon-carbon green part that will be transformed into a carbon-carbon composite.

Figure 2:
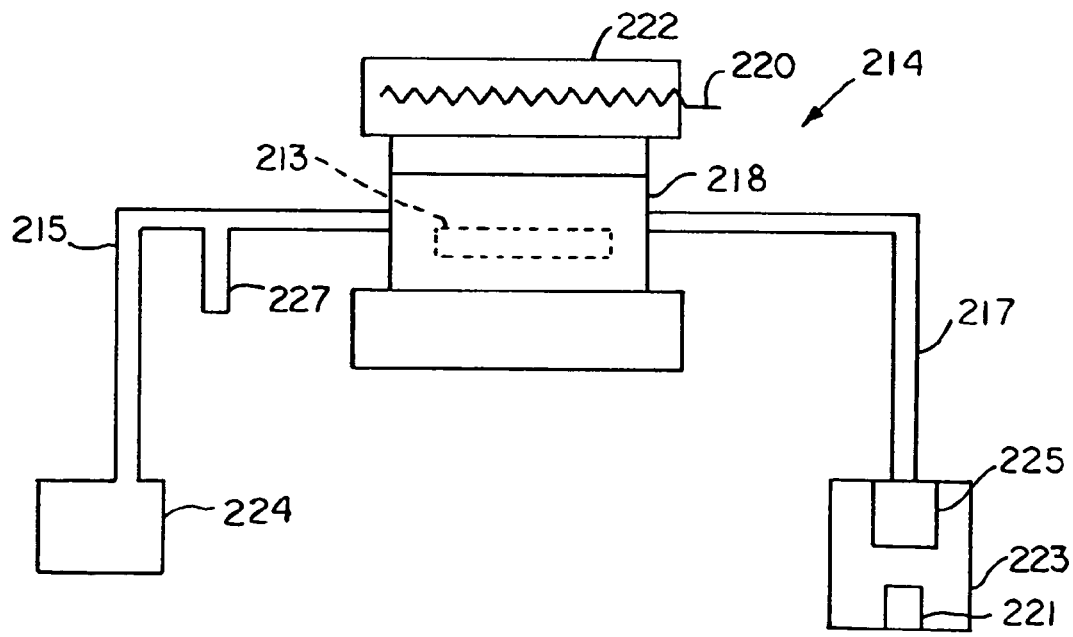
FIG. 2 is a schematic illustration of the impregnation station of the present invention.
Figure 4:
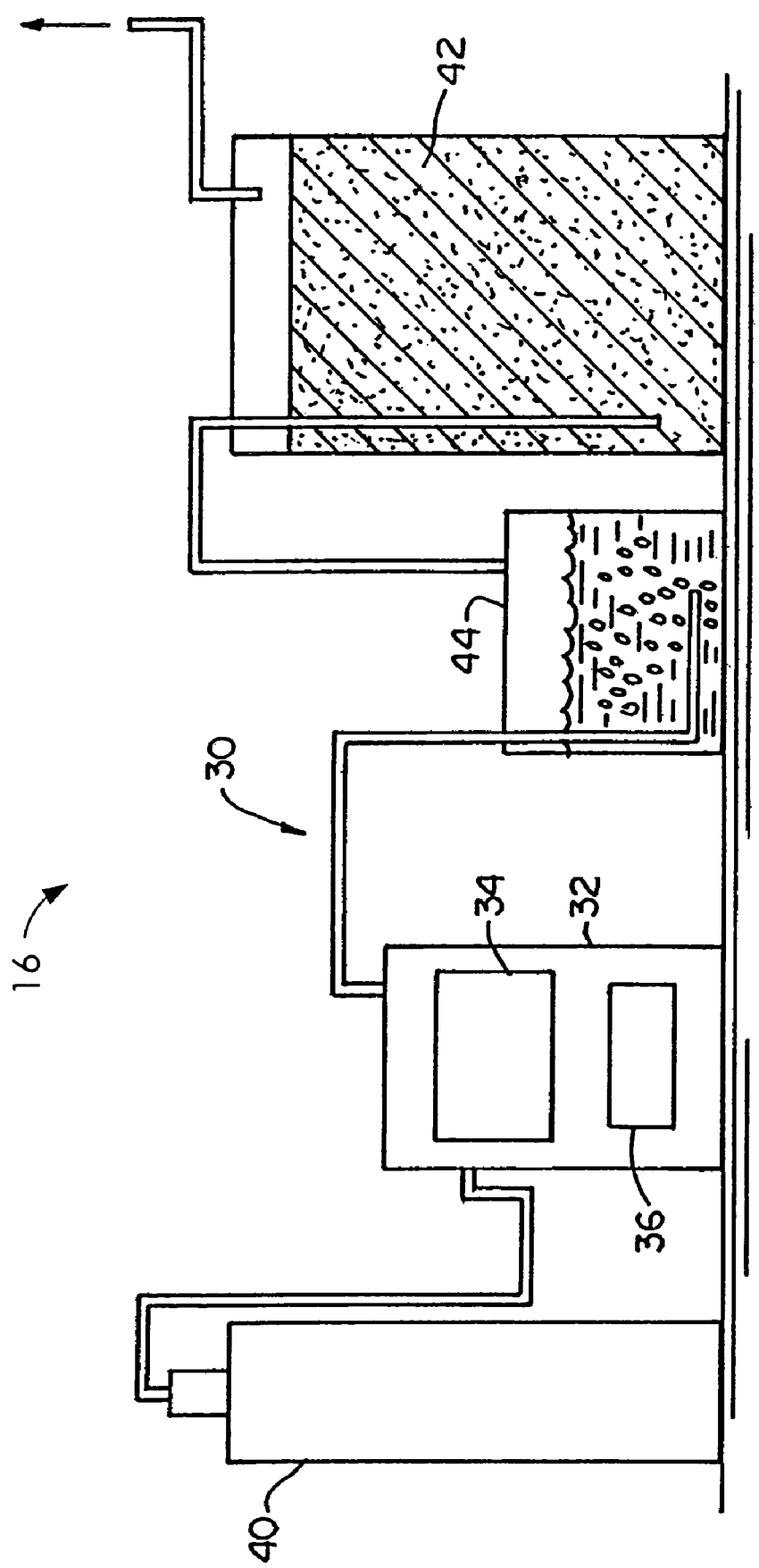
FIG. 4 is an illustration of the carbonization station of the present invention.

Referring now to the drawings in general and FIG. 1 in particular, it will be understood that the illustrations are for the purpose of describing a preferred embodiment of the invention and are not intended to limit the invention thereto. As best seen in FIG. 1, an apparatus for forming a densified carbon-carbon composite, generally designated 10, is shown constructed according to the present invention. The apparatus 10 includes three major sub-assemblies: a green part molding station 12 (FIG. 1); a impregnation station 214 (FIG. 2); and a carbonization station 16 (FIG. 4).

Figure 3A:
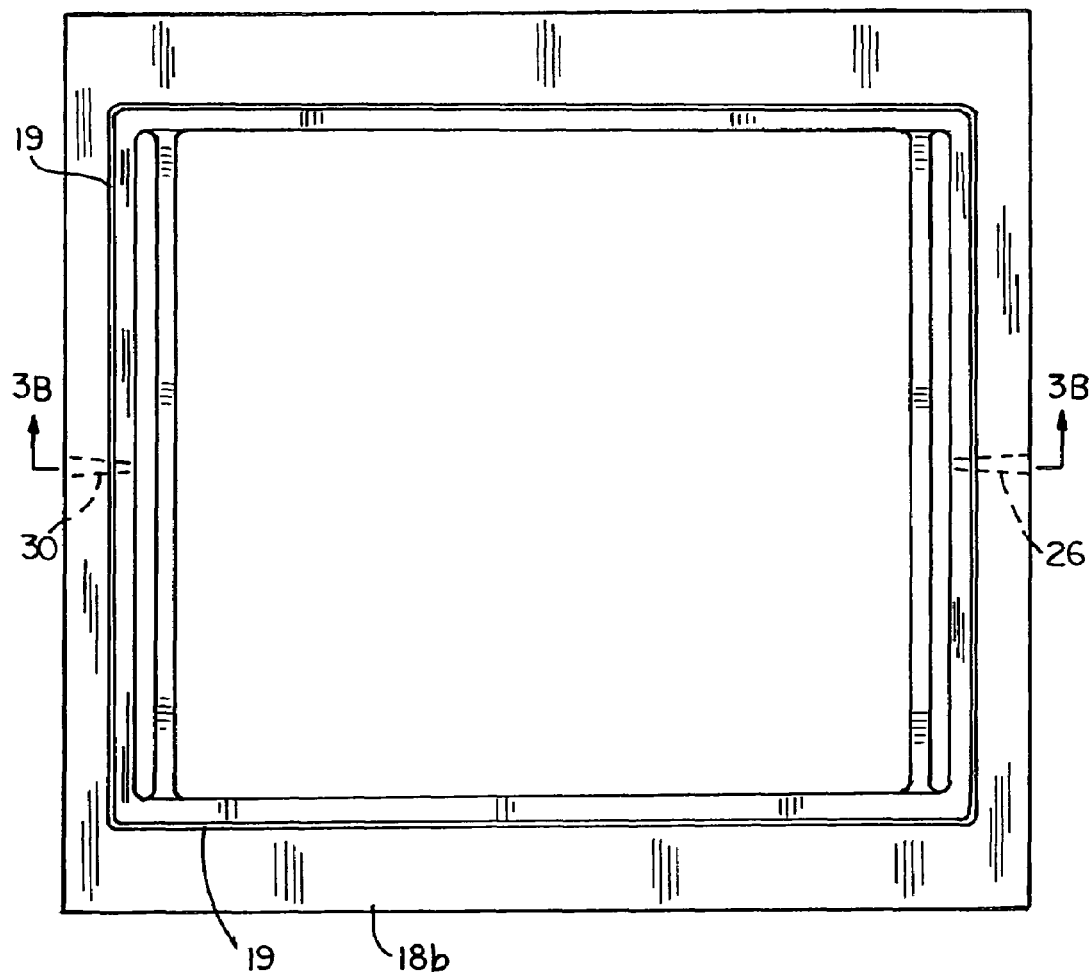
FIGS. 3A-3C is an illustration of the resin transfer molding device of the present invention.
Figure 3B:
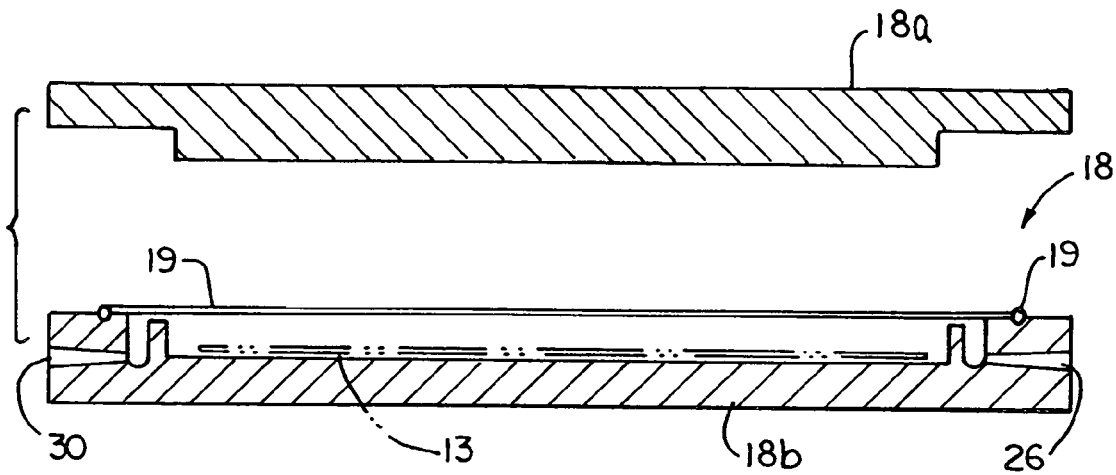
Figure 3C:
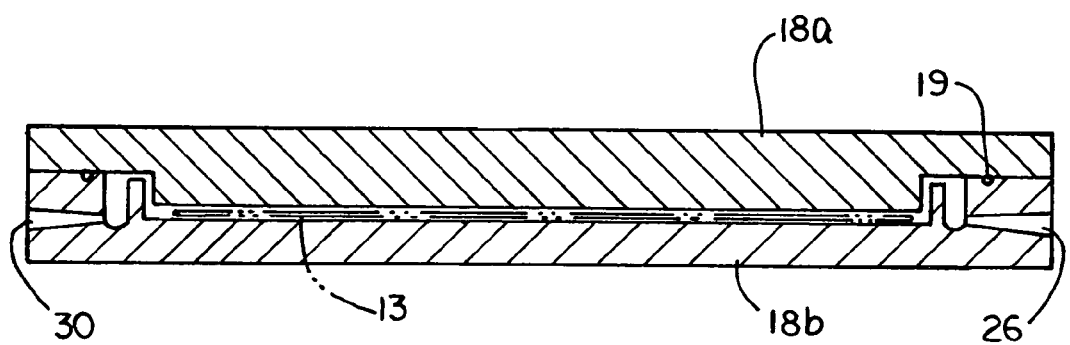

The green part molding station 12 is a resin transfer molding (RTM) station and includes a mold 18 having at least one surface configured to the shape of the part to be made. As shown in FIGS. 3A-3C, preferably the mold 18 is enclosed and includes an upper part 18a and a lower part 18b. A seal 19 (See FIG. 2) is provided in the lower part 18b to provide an airtight seal between the mold components during use. The mold 18 further includes a resin injection port 26 and a second evacuation port 30 for providing entrance and exit points, respectively, for the matrix. A resin reservoir 23 holds a supply of resin and communicates with the mold 18 via entrance conduit 17 and pump 25. A resin reservoir heating means is also provided to lower the viscosity of the resin sufficiently so that it may be pumped. A vacuum source 24 is connected to the mold 18 at the evacuation port 30. A preferred vacuum source is a vacuum pump. Alternatively, the vacuum source 24 may be connected to the mold at the injection port 26 via a "T" fitting to reduce the number of openings provided in the mold. In yet another embodiment, the vacuum source 24 may be connected to an external chamber for evacuating the mold 18. The green part molding station 12 further includes a platen press 22 which is provided with a heating means 20 for curing the resin.

The present invention further includes an impregnation station 214 (FIG. 2) that, in a preferred embodiment, is substantially identical to the green part molding station. That is, essentially the same station may be used to form the molded green part and to impregnate the carbon-carbon composite. The impregnation station includes a mold 218 having at least one surface configured to the shape of the part to be made. This mold 218 is substantially identical to the mold 18 described above. The impregnation station 214 includes a resin reservoir 223, inlet conduit 217, platen 222, platen heater 220, exit conduit 215, pump 223, resin heater 225, and vacuum source 224 as described above with respect to the green part molding station 12.

Both the green part molding station 12 and the impregnation station 214 further include appropriate valving, gauges and temperature sensors as needed to control the process of the present invention. These items have been omitted from the illustrations for the purpose of clarity but are properly within the scope of the claimed invention.

In a preferred embodiment, the matrix is a cyanate ester resin, which has a high carbon yield. The matrix carbon yield is an important determinant of process efficiency. This characteristic is determined by heating a known weight of matrix precursor in an inert atmosphere at a given temperature. The remaining carbon residue is then weighed. Carbon yield is the ratio of the weight of the carbon residue to the original weight. Desirably, the resin will have a carbon yield of at least about 25 percent after carbonization. More desirably, the resin will have a carbon yield of at least about 60 percent after carbonization.

In addition to having the carbon yield described above, the resin should be able to be heated to a high enough temperature for use in a RTM-like process. At the same time, the resin must not give off any gaseous by-product during cure and should have a suitable pot life. Desirably, the resin has a viscosity of less than about 100 centipose (cps) at 175° F. More desirably, the resin has a viscosity of less than about 50 cps at 175° F. A suitable resin is Primaset PT-30 available from Lonza Corporation.

Referring now to FIG. 4, the present invention further includes a carbonization station 30 comprised of a furnace 31 which includes an enclosed chamber 34, a heating means 36 for heating the chamber and a non-oxidizing atmosphere within the chamber. The non-oxidizing atmosphere can be provided by drawing a vacuum in the chamber 34 or, alternatively, by pressurizing the chamber using a non-reactive gas supply 40. Preferably, the non-reactive gas is nitrogen, however, any suitable such gas such as argon may be used. Preferably, the chamber 34 is pressurized to a pressure gas pressure during carbonization. Preferably, the heating means is adapted to heat the enclosed chamber 34 to a temperature of greater than about 650° C. More preferably, the heating means is adapted to heat the enclosed chamber 34 to a temperature of greater than about 950° C.

The carbonization station further includes a filtering system for cleaning the pyrolysis gases emitted by charring of the matrix in the enclosed chamber 34. The filtering system includes a water bath 44 and an activated carbon filter 42 connected to the enclosed chamber 34. The water bath 44 is interposed between the enclosed chamber 34 and the activated carbon filter 42.

Figure 5:
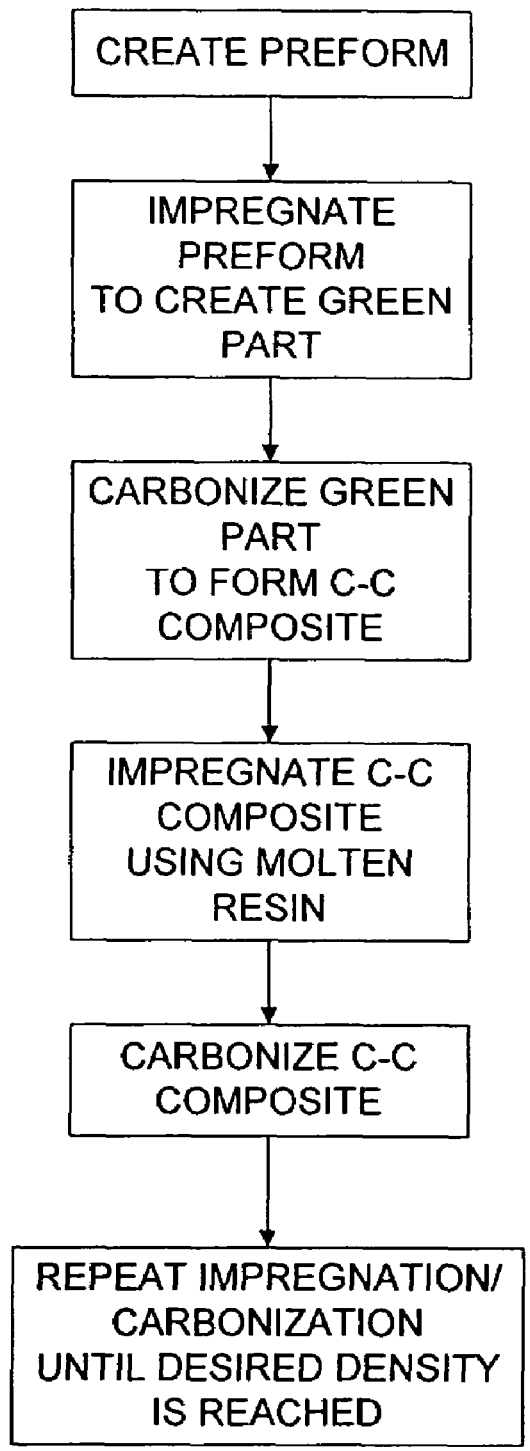
FIG. 5 is a flow chart illustrating the method of the present invention.

A method of forming a densified carbon-carbon composite according to the present invention is illustrated in the flow chart of FIG. 5. The method begins with the creation of a preform (Block 50) as described above. The preform is then impregnated to create a green part (Block 52). Desirably, the step may be carried out using a resin transfer molding apparatus. Next, the green part is carbonized to form a carbon-carbon composite (Block 54). The microvoids of the carbon-carbon composite are impregnated using a molten resin and without the use of any type of solvent to make the resin flowable (Block 56). The carbon-carbon composite is then carbonized to transform the resin to carbon. (Block 58) The impregnation and carbonization steps are repeated until a desired density for the carbon-carbon composite is reached (Block 59). As was discussed above, the step of creating the preform 50 is optional and the use of this step may vary depending on the shape of the item to be created.

The impregnation/densification steps of the present invention include placing the preform or carbon-carbon composite item 213 in the impregnation mold 218 and heating the mold to a temperature of between about 300-350° F. while being held closed by the platen 22. In order to maintain the proper viscosity and flowability of the matrix, the inlet conduit 217 and the outlet conduit 215 which connects the vacuum source 224 are heated. In a preferred embodiment, the inlet conduit 217 is maintained at a temperature of about 175° F. and the outlet conduit 215 is maintained at a temperature of about 200° F. Other temperatures may be used depending on the makeup of the resin being used. Next, a vacuum is pulled in the mold. The amount of this vacuum should be sufficient to ensure that proper impregnation is achieved. A vacuum of less than about 25 torr is desirable with a vacuum of less than about 10 torr being preferred. More preferably, a vacuum of less than about 2 torr is achieved. After a proper vacuum is achieved, the matrix is pumped into the mold. Desirably, the matrix is pumped at a pressure sufficient to fill the mold, about 150 psi, although a fill pressure as low as about 14 psi can be used. The pressure may then be raised to a packing pressure that is substantially higher than the pressure used to fill the mold. A packing pressure of about 300 psi is desirable in the practice of the present invention, although a packing pressure up to about 850 psi can be used. It will be appreciated that the impregnation of both the green part and the carbon-carbon composite is carried out solely by the hydraulic pressure created when the resin is introduced into the mold. The resin temperature, initial filling pressure and the packing pressure should be selected to achieve the desired densification. The parameters discussed herein are exemplary only and may be varied depending on many factors apparent to one of ordinary skill.

After the mold is full, it is burped to remove any trapped air with any matrix exiting the mold being caught in the matrix trap 27 connected to the exit conduit. The mold is then isolated using appropriate valving. The platen 222 serves as a means to hold the mold 218 closed while the resin is injected and cured and as a source of heat to the mold 218. In a preferred embodiment using the resin described above, a curing time of about 5 hours is used. However, it will be readily apparent that other curing times may be used depending on a number of factors to include the size of the article being created, the resin selected and the equipment available for this step.

The method of the present invention provides a number of advantages over solvent-based impregnation/densification processes. For example, the environmental and worker health concerns involved with handling and disposing of large volumes of hazardous solvents are eliminated. Also, solvents can present a significant fire risk. The process of the present invention provides for placing pressure on the impregnating fluid during the entire impregnation process. Further, there is no impregnate volume loss due to solvent loss. The absence of a solvent drying step reduces processing time significantly.

As will be appreciated by one of ordinary skill, the solvent drying step required by prior art processes is highly variable and difficult to manage. The solvent must escape from the innermost interstices of the part. If solvents are trapped in the composite structure at this stage, solvent gas generated by the resin curing process temperature can force the resin out of the porosity or even worse, blister or delaminate the part.

Figure 6:
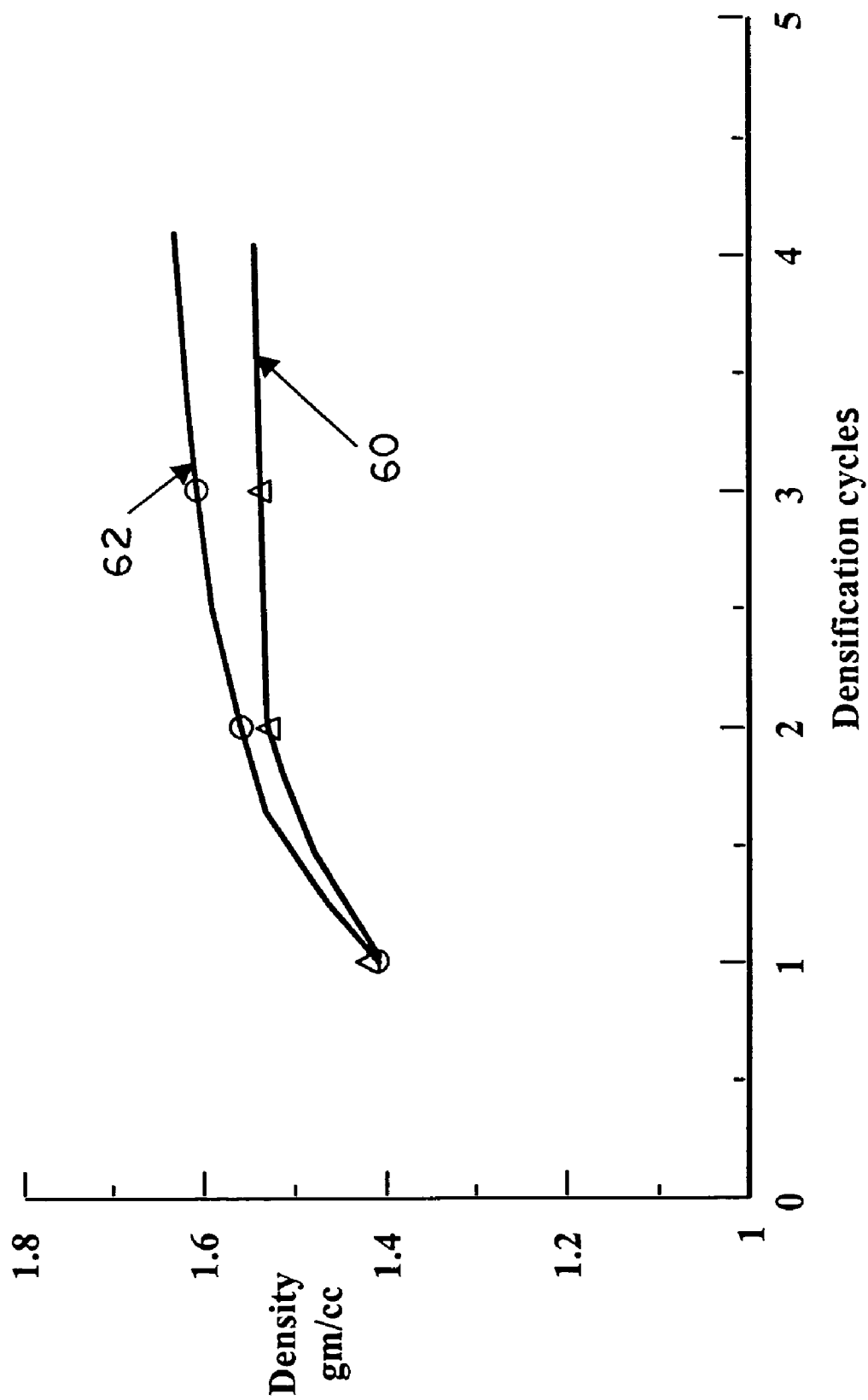
FIG. 6 is a graphical illustration of the improved results of the present invention as compared to the prior art processes.

The resin transfer molding (RTM) approach to making a carbon-carbon composite relies on an established, controllable and reproducible technology. RTM is a closed process that is capable of minimizing worker exposure to potentially hazardous chemicals. As can be seen in FIG. 6, for a given number of densification cycles, a higher density may be achieved by the method of the present invention. Curve 60 illustrates the density achieved using solvent-based approaches. Curve 62 shows the improved results achieved through the practice of the present invention. Experience with the present invention has shown that it will create a carbon-carbon composite having 95 percent of theoretical density after about three carbonization cycles.

Accordingly, significant cost reductions are achievable because of the reduced number of impregnations required. The use of RTM permits lower vacuums to be used during impregnation along with higher resin injection and holding pressures. All of these advantages combine to provide a more efficient manufacturing process and associated higher output.

Certain modifications and improvements will occur to those skilled in the art upon a reading of the foregoing description. By way of example, the mold may be provided with bolt fasteners to hold it closed while it is heated and evacuated. The bolted mold may then be placed in a oven for the step of curing the resin therein. Also, the resin may be transferred to the mold using a pressure pot rather than a pump. Alternatively, the resin may be pulled into the evacuated mold relying on vacuum alone for this step. It should be understood that all such modifications and improvements have been deleted herein for the sake of conciseness and readability but are properly within the scope of the following claims.

We claim:

1. A method for forming a densified carbon-carbon composite, said method comprising:
    (a) sealing a porous carbon part in an enclosure configured in the shape of the part;
    (b) injecting a substantially curing, by-product free, high carbon yield resin into the enclosure;
    (c) removing the porous carbon part from the enclosure and placing the part in a chamber without the enclosure;
    (d) carbonizing said porous carbon part in said chamber without the application of compressive force;
    (e) removing the part from the chamber; and
    (f) re-impregnating the part in the enclosure.

2. A method for forming a densified carbon-carbon composite, said method comprising:
    (a) forming a green part;
    (b) impregnating said green part with a substantially curing, by-product free resin in an enclosure configured in the shape of the desired carbon-carbon composite while heating said enclosure to a temperature of only about 300° F. to only about 350° F.;
    (c) carbonizing said impregnated green part without the application of compressive force to form a carbon-carbon composite;
    (d) sealing said carbon-carbon composite in said enclosure configured in the shape of said green part; and
    (e) re-impregnating said carbon-carbon composite with a substantially curing, by-product free resin while heating said enclosure to a temperature of only about 300° F. to only about 350° F.

3. The method according to claim 2, wherein said forming and said impregnating are performed at substantially the same location.

4. The method according to claim 2, wherein said carbonizing includes heating said green part in a non-oxidizing atmosphere in an enclosed chamber.

5. The method according to claim 4, wherein said heating involves heating said enclosed chamber to a temperature greater than about 650° C.

6. The method according to claim 4, wherein said heating involves heating said enclosed chamber to a temperature of about 950° C.

7. The method according to claim 4, wherein said carbonizing is done in a vacuum.

8. The method according to claim 4, wherein the atmosphere is a non-reactive gas.

9. The method according to claim 8, wherein the atmosphere is at a positive pressure.

10. The method according to claim 8, wherein said non-reactive gas is nitrogen.

11. The method according to claim 4, further including cleaning the atmosphere exiting the enclosed chamber.

12. The method according to claim 11, wherein said cleaning is done using an activated carbon filter.

13. The method according to claim 11, wherein the cleaning includes passing the atmosphere exiting the enclosed chamber through a water bath.

14. The method according to claim 2, further including forming a pre-form for said green part.

15. The method according to claim 2, wherein said green part forming includes configuring at least one surface for said green part into a desired shape.

16. The method according to claim 15, wherein a mold is used to configure the at least one surface of said green part into the desired shape and to thereby form a sealed enclosure.

17. The method according to claim 16, further including evacuating said sealed enclosure.

18. The method according to claim 2, further including curing said green part.

19. The method according to claim 2, further including maintaining said green part under pressure.

20. A method for impregnating a carbonized part with a substantially curing, by-product free, high carbon yield resin to form a densified carbon-carbon composite, said method comprising:
(a) impregnating a preform in an enclosure configured in the shape of said part;
(b) carbonizing said preform to produce a carbonized part without the application of compressive force;
(c) sealing said carbonized part in said enclosure;
(d) re-impregnating said carbonized part with a substantially curing by-product free, high carbon yield resin;
(e) heating said enclosure to a temperature of only about 300° F. to only about 350° F.;
(f) carbonizing said re-impregnated carbonized part without the application of compressive force;
(g) re-impregnating said part in said enclosure; and
(h) repeating steps (f) and (g) until a desired level of density is achieved.

21. The method according to claim 20, further including evacuating said sealed enclosure.

22. The method according to claim 21, further including surrounding said sealed enclosure with an outer chamber to facilitate evacuating of said sealed enclosure.

23. The method according to claim 21, wherein said evacuating and said impregnating are affected substantially along the same path.

24. The method according to claim 21, wherein said evacuating and said impregnating are affected substantially along different paths.

25. The method according to claim 20, further including curing said resin impregnated carbonized body.

26. The method according to claim 20, further including pressuring during said impregnating.

27. The method according to claim 20, further including heating said resin prior to said impregnating.

28. The method according to claim 20, further including pumping said resin to said sealed enclosure.

29. The method according to claim 28, wherein said pumping is at a pressure just sufficient to fill said sealed enclosure with said resin.

30. The method according to claim 29, further including a second, packing pumping to a pressure for impregnating said carbonized part with said resin.

31. The method according to claim 30, wherein said packing pressure is substantially greater than said fill pressure.

32. The method according to claim 31, wherein said packing pressure is up to about 850 psi.

33. The method according to claim 32, wherein said fill pressure is as low as about 14 psi.

34. The method according to claim 20, wherein said resin has a viscosity of less than about 100 cps at 175° F.

35. The method according to claim 34, wherein said resin has a viscosity of less than about 50 cps at 175° F.

36. The method according to claim 20, wherein said substantially curing by-product free, high carbon yield resin is a cyanate ester.

37. The method according to claim 20, wherein said substantially curing by-product free, high carbon yield resin has a carbon yield value of greater than about 25 wt. %.

38. The method according to claim 20, wherein said substantially curing by-product free, high carbon yield resin has a carbon yield value of greater than about 60 wt. %.

39. A method for densifying a carbon-carbon composite comprising the steps of:
(a) sealing a porous carbon part in an enclosure configured in the shape of said porous carbon part;
(b) impregnating said porous carbon part with a substantially curing, by-product free, high carbon yield resin while heating said enclosure to a temperature of only about 300° F. to only about 350° F. to produce an impregnated part;
(c) removing said impregnated part from said enclosure and placing said impregnated part in a chamber without said enclosure;
(d) carbonizing said impregnated part in said chamber without the application of compressive force to form a carbon-carbon composite;
(e) removing said carbon-carbon composite from said chamber and placing said composite in said enclosure;
(f) re-impregnating said carbon-carbon composite with a substantially curing by-product free, high carbon yield resin while heating said enclosure to a temperature of only about 300° F. to only about 350° F.;
(g) removing said re-impregnated carbon-carbon composite from said enclosure and placing said composite in said chamber without said enclosure;
(h) carbonizing said re-impregnated carbon-carbon composite without the application of compressive force; and
(i) repeating steps (e), (f), (g) and (h) until a desired level of density is achieved.

40. The method of claim 39, further comprising the steps of creating a preform, impregnating said preform in said enclosure and carbonizing the preform without the application of compressive force to create said porous carbon part.

* * * * *